Inventor
THOMAS G. BROWN, JR.
By Alfred C. Hill
Agent

Sept. 6, 1960 T. G. BROWN, JR 2,951,906

DELAY DEVICE

Filed Feb. 11, 1957 4 Sheets-Sheet 2

Inventor
THOMAS G. BROWN, JR.

By Alfred C. Hill
Agent

Sept. 6, 1960 T. G. BROWN, JR 2,951,906

DELAY DEVICE

Filed Feb. 11, 1957 4 Sheets-Sheet 3

Inventor
THOMAS G. BROWN, JR.
By Alfred C. Hill
Agent

Inventor
THOMAS G. BROWN, JR.
By Alfred C. Hill
Agent 2,951,906

DELAY DEVICE

Thomas G. Brown, Jr., Paramus, N.J., assignor to International Telephone and Telegraph Corporation, Nutley, N.J., a corporation of Maryland Filed Feb. 11, 1957, Ser. No. 639,473

14 Claims. (Cl. 179—15)

This invention relates to delay devices and more particularly to delay devices capable of exhibiting a number of different predetermined delay characteristics.

Delay devices today are well known. However, most of the known delay devices are limited as to the number of delay characteristics they are capable of exhibiting, and those capable of exhibiting a number of different types of delay characteristics have been in the past complicated so that the advantages achieved by the number of different delay characteristics is overcome by the complications found in the equipment necessary to achieve the number of different delay characteristics.

An object of the present invention is to provide a relatively simple delay device capable of exhibiting a number of different delay characteristics.

Another object of this invention is to provide a delay device employing a novel electron beam tube construction in which various delay characteristics may be achieved by modifying one element thereof.

The delay device of this invention will be discussed in connection with its use in communication systems, such as those systems employing pulse time modulation (PTM). However, it is to be understood that the delay device of this invention may be employed wherever a distinctive delay characteristic is required.

Therefore, still another object of this invention is to provide delay devices having non-linear delay characteristics to accomplish amplitude compression and complementary amplitude expansion in PTM communication systems.

A further object of this invention is to provide delay devices having a linearly varying delay characteristic to accomplish linear amplitude contraction and linear amplitude stretching of the PTM pulse deviation in PTM communication systems.

Still a further object of this invention is to provide an improved delay device having a constant delay characteristic.

A feature of this invention is the provision of a delay device comprising an electron beam tube including an aperture screen and means to controllably sweep the electron beam across said screen wherein the configuration of the aperture of said screen determines the delay characteristic of the delay device of this invention.

A more specific feature of this invention is the provision of a delay device comprising an electron beam tube having means to project an electron beam along a given path, a target electrode disposed in said path and adapted to be impinged on by said electron beam and an electron opaque screen disposed in said path intermediate said target electrode and said beam projecting means. The electron opaque screen includes an aperture therethrough having a configuration correlated with a predetermined delay characteristic. There is further provided means to deflect the electron beam across said screen along a given coordinate and spaced from said aperture in synchronism with a repetitious signal and a second deflection means responsive to the time position of a pulse signal to deflect said electron beam in a second coordinate angularly related to said given coordinate to cause said beam to cross said aperture. An output means is associated with said target electrode to derive an output pulse therefrom when the electrons of the beam impinge on said target electrode, the derived pulse output being delayed in time with respect to the time position of said pulse signal in accordance with the time that the electron beam crosses said aperture.

A further feature of this invention is the provision of the electron beam tube of this invention having on the electron opaque screen a given aperture configuration which may serve as its own complement by providing means to properly locate the start of the electron beam sweep and the angle at which said electron beam cuts across said given aperture.

The above-mentioned and other features and objects of this invention will become more apparent by reference to the following description taken in conjunction with the accompanying drawings, in which:

Figs. 4*a* to 8*a* illustrate the corresponding delay characteristics to which the apertures of Figs. 4 to 8 are correlated;

Figure 9:
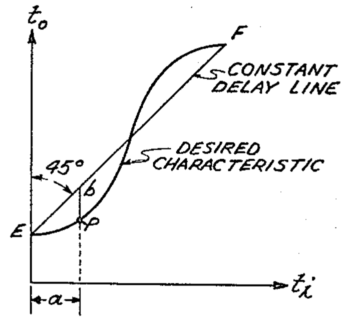
Figure 9A:
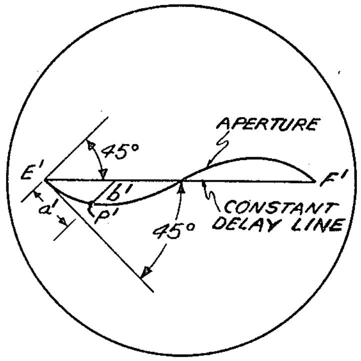
Figure 10:
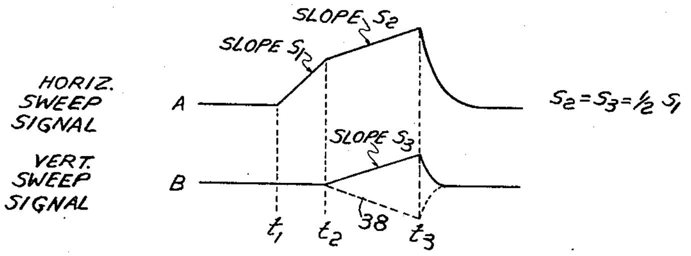
Figure 11:
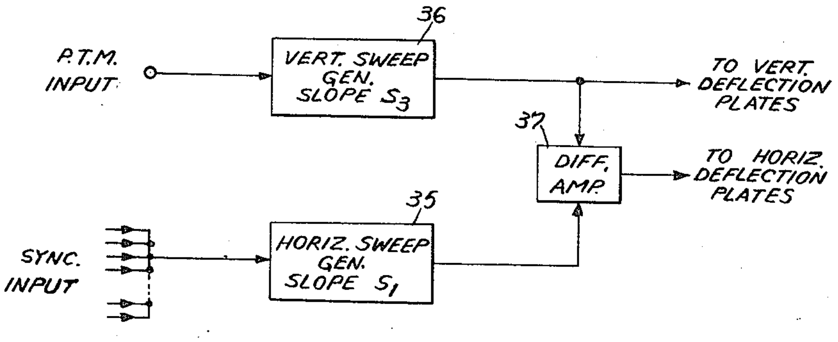

Figs. 9 and 9*a* illustrate the relationship between the delay characteristic and the aperture present in the electron opaque screen of the delay device of this invention;

Fig. 10 illustrates the sweep waveform necessary to have a given electron beam tube and aperture screen act as their own complement; and Fig. 11 illustrates one form of the equipment necessary to generate the waveforms of Fig. 10.

Figure 1:
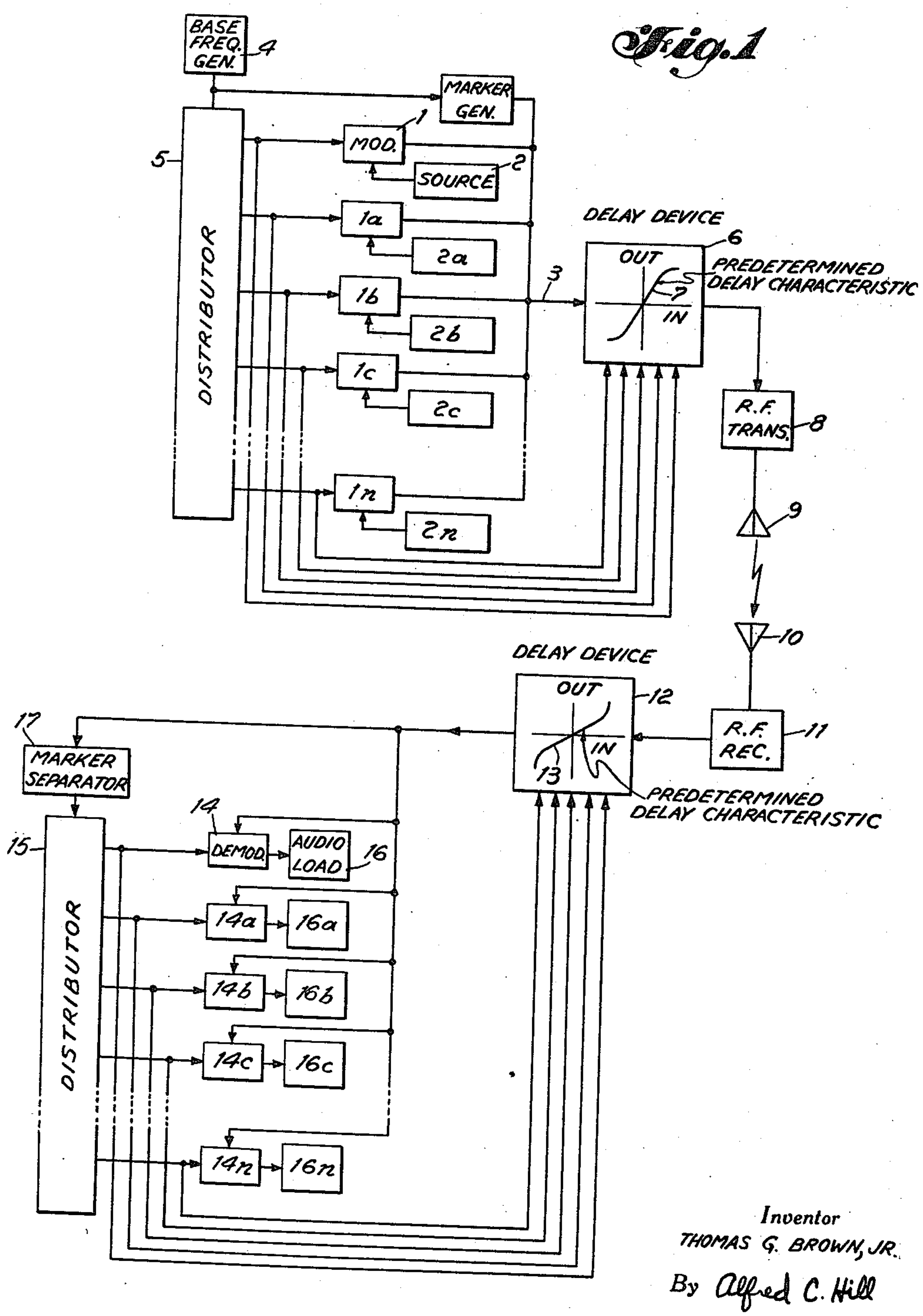
Fig. 1 is a block diagram of a PTM system embodying complementary delay devices following the principles of this invention.

Referring to Fig. 1, a multichannel communication system is disclosed employing two complementary delay devices in accordance with the principles of this invention. The multiplexer end of the system employs a plurality of PTM modulators 1 of any well-known kind, such, for example, as described in U.S. Patent 2,485,591. Each modulator produces a series of pulses representing by their time position the amplitude of the signals of modulating sources 2. The outputs of modulators 1 are coupled to a common point 3 for multiplexing into a time division PTM pulse train. The timing of each channel PTM pulse is determined by the base frequency generator 4 and the delay line timing distributor 5. The generator 4 also times the production of a synchronizing or marker pulse repetitious at the frequency at the output of generator 4. Thus, at point 3, the channel PTM pulses are interleaved in time between successive marker pulses to produce a plurality of pulse trains repetitious at the frequency of generator 4. The PTM pulses of each signal channel occupy a given time interval of the pulse train. This given time interval is the maximum time deviation of the PTM pulses, said maximum time deviation being proportional to the maximum amplitude of the modulating signal. A guard time may be provided between adjacent channels. The PTM pulse trains then are impressed upon a delay device 6 according to the invention and to be described hereinbelow. For purposes of illustration, delay device 6 is illustrated as exhibiting as the predetermined delay characteristic a compressor characteristic 7. Thus, the general characteristic of delay device 6 is non-linear such that most of the time deviations proportional to modulating signal amplitude are concentrated in the early part of the PTM pulse time deviation. One way of doing this is to decrease the time deviation of the successive sampled amplitudes of the modulating signal in such a way that the successive decreased time deviations follow a predetermined characteristic. The curve relating instantaneous input signal time deviation to instantaneous output signal time deviation of the delay device operating as a compressor may be according to any predetermined delay characteristic, such, for example, as that represented by the delay characteristic 7. The compressed time deviations of PTM pulse are then transmitted over any suitable radio frequency transmitter 8 of known design and then impressed upon the transmitting antenna 9.

The delay characteristic of device 6 may be a linear varying characteristic which would be represented by a straight line. If the linear characteristic is decreasing, the time deviation of a channel PTM pulse will be contracted linearly. This will find utility in a PTM system to facilitate interleaving the pulse train of the equipment shown in Fig. 1 at the multiplexer end thereof with the pulse train of a second multiplexer having substantially the same equipment as illustrated in Fig. 1 to thereby increase the number of communication channels transmitted over a single radio frequency path. At the demultiplexer end of the communication system, the separate pulse trains of the two multiplexers would be operated on by a complementary linear stretcher which has a delay characteristic which linearly increases or stretches the time deviation of the individual channel pulses. These two linear characteristics or devices could be interchanged to achieve the opposite effect in the overall communication system, that is, linearly stretch the time deviation of a channel PTM signal at the multiplexer and contract the channel PTM signal at the demultiplexer.

Using the delay device of this invention and the appropriate delay characteristic, as hereinbelow described, it is possible to exhibit to a pulse train a constant delay which will facilitate the time shifting of the entire pulse train to cooperate in the interleaving of two similar PTM pulse trains to increase the number of intelligence channels transmitted over a single radio frequency link.

The signals radiated from antenna 9 are received by a suitable receiving antenna 10 and are impressed upon any well-known radio receiver 11 for detecting the PTM signals. These PTM signals are passed through delay device 12 which has a characteristic as illustrated by curve 13 relating instantaneous input signal time deviation to instantaneous output signal time deviation. As illustrated, curve 13 is complementary to characteristic 7 of the device 6. If the linearly increasing characteristic were used, the characteristic device 12 would normally be complementary to the linear characteristic of device 6.

The PTM pulse train operated on by device 12 is then coupled to a plurality of well-known demodulators 14. Demodulators 14 under control of the timing pulse of delay line distributor 15 separates its corresponding channel pulse from the pulse train and converts the PTM pulse into intelligence signals. This operation is described in said U.S. Patent 2,485,591 and gives an example of one type of demodulator that may be employed in conjunction with my novel delay device. The outputs of demodulators 14 are coupled to their respective channel loads 16.

The timing of the outputs of distributor 15 is synchronized with the transmitter base frequency generator 4 by the synchronizing or marker signals. This marker signal is detected in marker separator 17 which supplies a synchronized signal to distributor 15 for the appropriate timed distribution to the demodulators 14.

Figure 2:
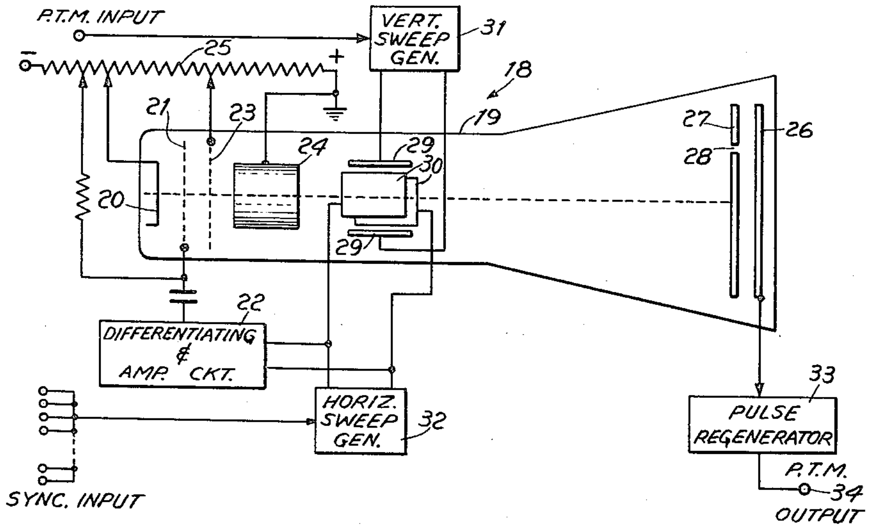
Fig. 2 is a schematic diagram of the electron beam tube delay device and associated circuitry according to the principles of this invention.

Referring to Fig. 2, the delay devices 6 and 12 will be described in detail to set forth the construction thereof and the operation of such a device to be employed as either a constant delay device, a linearly varying delay device or a non-linear delay device, which is particularly useful in conjunction with a PTM communication system. However, it is to be remembered that the delay device may be constructed to exhibit any desired delay characteristic.

The delay device of this invention comprises an electron beam tube 18 having the usual evacuated enclosing housing 19 with a cathode 20 disposed at one end thereof. Mounted in relatively close spaced relationship to the cathode is a control grid 21 upon which blanking signals are impressed from circuit 22 to assure the blanking of the electron beam on the return portion of the sweep voltage. The electrons from cathode 20 are formed into a narrow pinpoint beam by accelerating electrodes 23 and 24 which are connected to appropriate potentials. These potentials may be derived from voltage divider 25. Located in the path of the electron beam at the other end of housing 19 is disposed a target electrode 26 upon which the electron beam will impinge. Disposed intermediate target electrode 26 and cathode 20 is an electron opaque screen 27 having therein an aperture 28 having its configuration correlated to a predetermined delay characteristic. Intermediate screen 27 and cathode 20 is disposed beam deflection means. As illustrated, the beam deflection means includes vertical deflection plates 29 and horizontal deflection plates 30. It is to be understood that while I have illustrated electrostatic deflection means, it would be possible to employ magnetic deflection means to carry out the principles of this invention.

Sweep voltage on vertical deflection plates 29 is applied from the vertical sweep generator 31, the initiation of which is timed by the time position of the PTM channel input. The horizontal sweep voltage is applied to horizontal deflection plates 30 from horizontal sweep generator 32, the initiation of which is timed by the repetitious synchronizing input. As illustrated in Fig. 1, for a multichannel pulse train, the synchronizing input can be derived from the time spaced taps disposed along distributor 5 to properly time the operation of device 6 for operation upon successive channel signals.

Figure 3:
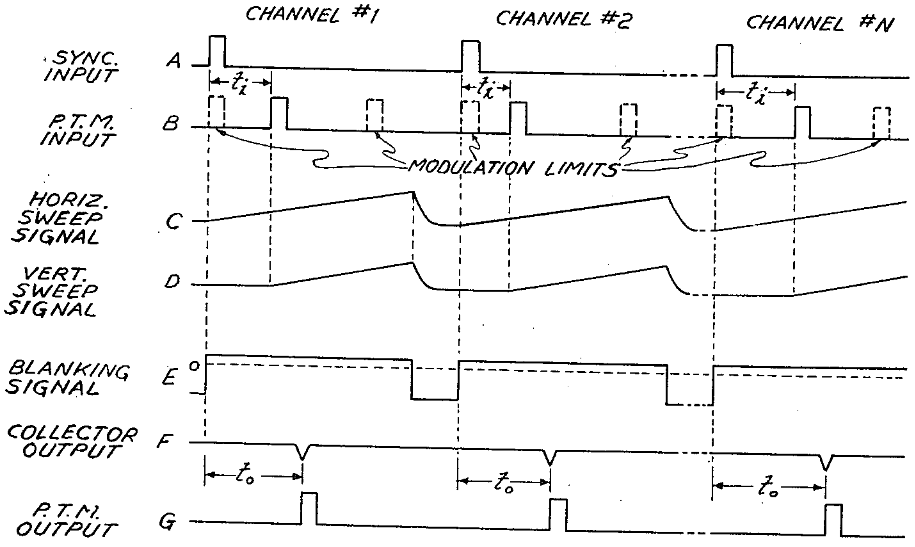
Fig. 3 illustrates a set of curves useful in explaining the operation of the device of Fig. 2.

Having hereinabove described the basic structure of my delay device, the operation thereof will now be described in connection with Fig. 3. The sync pulse input of curve A, Fig. 3, is applied to sweep generator 32 to initiate the horizontal sweep signal having a linear slope as illustrated in curve C, Fig. 3. The action of the horizontal sweep signal is to sweep the electron beam along a given coordinate of the screen 27 spaced from aperture 28. This is illustrated in Figs. 4 to 8 by the broken line A—B. The spaced relationship between aperture 28 and the beam trace path A—B may be accomplished by appropriately biasing the electron beam by the deflection circuitry or by shifting the aperture 28 from the center of screen 27 a sufficient amount.

The PTM channel input of curve B, Fig. 3, is coupled to vertical sweep generator 31. The time position of the PTM pulse, as indicated by the solid pulse of curve B, initiates the vertical sweep signal, as illustrated in curve D, Fig. 3. The sweep signal of generator 31 has substantially the same slope as the horizontal sweep signal from generator 32. Thus, the vertical sweep starts at a later time than the horizontal sweep so that at the time the electron beam reaches point B of Figs. 4 to 8, the vertical sweep starts, causing the electron beam to move along a second coordinate angularly related to said given coordinate. The second coordinate is at substantially a 45° angle to said given coordinate along line B—D. The 45° angle at which the electron beam moves with respect to the horizontal or given coordinate, from point B to point D, requires that the two sweep signals have equal slopes and that the horizontal and deflection sensitivities are equal. The trace of the electron beam crosses aperture 28, which is a thin slit in screen 27, at point C. The beam passes through the aperture and strikes the target electrode 26. The resulting current pulse at the target electrode 26 serves as the output signal. This is illustrated in curve F, Fig. 3. It illustrates that the output pulse is delayed in time with respect to the input pulse, the channel pulse of curve B, Fig. 3, by a given amount depending upon the configuration of the aperture and hence the predetermined delay characteristic to which the aperture is correlated. The current pulse of target electrode 26 is coupled to pulse regenerator 33, Fig. 2, for reshaping to produce a pulse substantially as shown in curve G, Fig. 3, for coupling to the PTM output terminal 34. While the output of tube 18 is taken from target electrode 26, it will be obvious that the output can be taken from screen 27, if electrode 26 has a coating thereon which will release secondary electrons therefrom upon impingement by the electron beam. The secondary electron emission would be from electrode 26 to screen 27, or a metallic coating thereon faced toward electrode 26, and the output connection from tube 18 would be from screen 27 or the metallic coating thereon.

During the retrace portion of the sweep signals, curves C and D, a blanking pulse is generated in circuit 22, as controlled by the sweep generator 32, and applied to control grid 21 to assure that the electron gun is cut off during this retrace period. The blanking signal is illustrated in curve F, Fig. 3.

As illustrated, the output signal is delayed with respect to the input pulse. The amount of this delay is proportional to the length of the line B—C, Figs. 4 to 8, which is determined by the configuration of aperture 28. The time position of the input PTM pulse with respect to the synchronizing input determines the length of line A—B, Figs. 4 to 8.

Thus, it is possible to produce any desired transfer or delay characteristic (time input versus time output characteristic) merely by properly shaping the aperture 28. The desired delay characteristic is produced mechanically in the construction of the screen. Everything else including the circuitry is unchanged. Figs. 4 to 8 illustrate several possible delay characteristics which will find application in PTM communication systems or in other applications where distinct delay characteristics are desired. These examples do not exhaust the possible delay characteristics available for the delay device of this invention. Many variations will be apparent to one skilled in the art.

Figure 4:
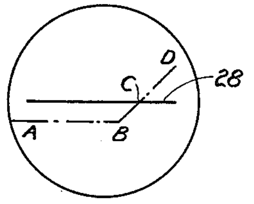
Figs. 4 to 8 illustrate the electron opaque screen having an aperture correlated to various delay characteristics.
Figure 4A:
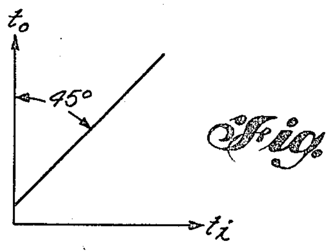
Figure 5:
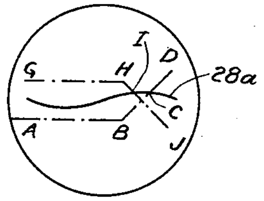
Figure 5A:
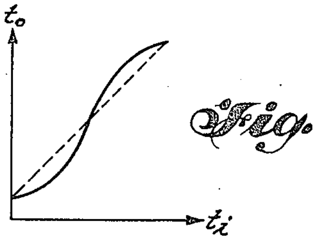
Figure 6:
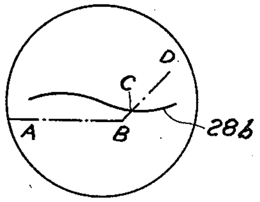
Figure 6A:
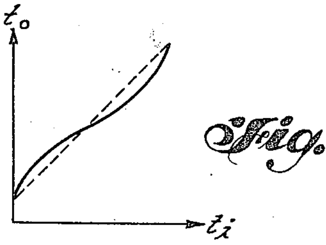
Figure 7:
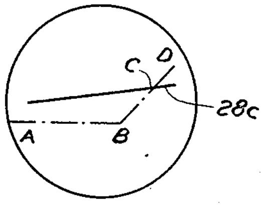
Figure 7A:
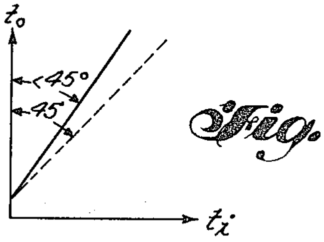
Figure 8:
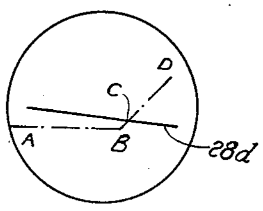
Figure 8A:
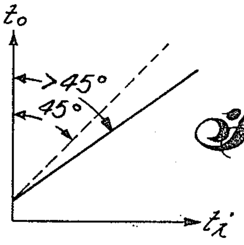

Fig. 4 illustrates the aperture necessary to achieve a constant time delay characteristic, while Fig. 4*a* illustrates its correlation to the actual delay characteristic. It will be noticed that in Fig. 4*a* the delay characteristic is represented by a straight line at a 45° angle with the vertical coordinate and that the aperture location on the screen is on the horizontal and parallel to the horizontal sweep path of the electron beam. Fig. 5 illustrates an aperture configuration to achieve PTM compression, while Fig. 5*a* illustrates the compressor delay characteristic. The compressor characteristic is non-linear in nature but symmetrically located about the constant delay line which is at a 45° angle with the vertical coordinate. Fig. 6 illustrates the shape of an expander aperture, while Fig. 6*a* illustrates the expander characteristic which is non-linear and symmetrically arranged about the constant delay line. Fig. 7 illustrates the aperture configuration for a PTM stretcher which will linearly stretch the PTM deviation. Fig. 7*a* illustrates the stretcher delay characteristic which is a linearly increasing delay line at an angle of less than 45 degrees with the vertical coordinate and thus is disposed above the constant delay line. Fig. 8 illustrates the configuration of the contractor aperture which is complementary to the stretcher aperture. Fig. 8*a* illustrates that the delay characteristic is a linearly decreasing delay line which is at an angle of more than 45 degrees with the vertical coordinate and thus is disposed below the constant delay line. Thus, the delay characteristic achieved by the apertures of Figs. 7 and 8 enable the multiplication of the time deviation of the signal by a constant. If the constant is greater than unity, the device is a stretcher and if less than unity, the device is a contractor.

Fig. 9 illustrates a delay characteristic for compressing the time deviation of PTM channel signal pulses. Employing this delay characteristic, it is desired to construct the corresponding screen aperture for the delay device of this invention which is shown in Fig. 9*a*. To accomplish this, the following relations must be employed to provide proper correlation between the desired delay characteristic and the aperture configuration. If the dimension $a'$ satisfies the relation $$\frac{a'}{a}=\frac{E'F'}{EF}$$

then the dimension $b'$ must satisfy the relation $$\frac{b'}{b}=2\frac{E'F'}{EF}$$

It can be shown that a given delay characteristic can become its own complement merely by interchanging the $t_0$ and $t_1$ axes if, in addition, a constant amount is added to $t_0$ so that the relationship $t_0$ is equal to or greater than $t_1$ is satisfied. However, it has been shown in connection with the discussion of Figs. 9 and 9*a* that the shape of the aperture is not identical with the shape of the delay characteristic but is correlated or related thereto. Thus, under these conditions, a given aperture cannot serve as its own complement. Two different, but related apertures are required.

While the apertures cannot serve as their own complement, the delay device described in connection with Fig. 2 can be modified so that it will possess the property of serving as its own complement. Fig. 10 illustrates the sweep signals necessary to modify the operation of tube 18, Fig. 2, to serve as its own complement. Curve A illustrates the horizontal sweep signal. At time $t_1$ the horizontal sweep starts with a slope $s_1$ and at time $t_2$ the slope is reduced to $s_2$ which is equal to one half the slope $s_1$. The vertical sweep signal of curve B, Fig. 10, is triggered at time $t_2$ and has a slope $s_3$ which is equal to slope $s_2$. As before, this assumes equal deflection sensitivities in the vertical and horizontal deflection plates.

Fig. 11 illustrates the modification of the sweep circuits which facilitate the achievement of the sweep signals of Fig. 10. The horizontal sweep generator 35 has a slope $s_1$ and, as before, is triggered from the synchronizing input. The vertical sweep generator 36 has a slope $s_3$, which as before, is triggered from the PTM signal input. The output of sweep generator 35 is coupled to a differential amplifier 37 having a unity gain. Thus, between $t_1$ and $t_2$ there will be no output from sweep generator 36 but there will be output from sweep generator 35 which is coupled through differential amplifier 37 with substantially the same slope and is coupled to the horizontal deflection plates. The electron beam will be swept along the given or horizontal coordinate spaced from the aperture 28. At time $t_2$, the vertical sweep generator 36 is triggered into operation and its output will be coupled directly to the vertical deflection plates of tube 18 and also to the differential amplifier 37. The slope of the resultant output of amplifier 37 will be the difference between slope $s_1$ and slope $s_3$ which is a slope $s_2$ provided the relationships mentioned hereinabove of the slopes of the sweep signals are adhered to. By employing the differential amplifier 37, the necessary timing for the change of slope of the horizontal sweep signal is adequately taken care of.

For the modification discussed in Figs. 10 and 11 everything previously stated still is valid, except that the aperture shape is modified so that it is an exact replica of the delay characteristic. That is, $$b' = b\frac{E'F'}{EF}$$

instead of $$2b\frac{E'F'}{EF}$$

Therefore, a given tube is converted from any given function to its complement merely by reversing the polarity of the vertical sweep signal as illustrated in Fig. 10 by dotted line 38 and by changing the point at which the sweep originates. The change in the point at which the sweep originates can be accomplished by differently biasing the sweep generator so that the sweep will commence at point G, Fig. 5, rather than at point A. The action of the horizontal sweep waveform will be such as to sweep the electron beam from point G to H between time $t_1$ and $t_2$. At time $t_2$, the vertical sweep, as represented by curve 38, Fig. 10, will sweep the signal from point H to J which will result in the beam passing through aperture 28 at point I and thus produce an output having a complementary delay with respect to the delay experienced when the electron beam traverses the path A—B—D.

While I have described above the principles of my invention in connection with specific apparatus, it is to be clearly understood that this description is made only by way of example and not as a limitation to the scope of my invention as set forth in the objects thereof and in the accompanying claims.

I claim:

1. A delay device having a predetermined delay characteristic comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration correlated with said predetermined delay characteristic, a source of a repetitious signal, means to deflect said electron beam across said screen along a given coordinate and spaced from said aperture in synchronism with said repetitious signal, a time modulated pulse signal source, means responsive to the time position of a pulse signal from said signal source to deflect said electron beam in a second coordinate angularly related to said given coordinate to cause said beam to cross said aperture, and means to derive a pulse output from the electrons impinging on said target electrode, said pulse output being delayed in time with respect to the time position of said pulse signal in accordance with the time that the electron beam crosses said aperture.

2. A delay device according to claim 1, wherein said predtermined delay characteristic is a constant delay characteristic and the configuration of said aperture is a straight line disposed parallel to said given coordinate.

3. A delay device according to claim 1, wherein said predetermined delay characteristic is a non-linear delay characteristic and the configuration of said aperture is a non-linear curve symmetrically disposed about a line parallel to said given coordinate.

4. A delay device according to claim 1, wherein said predetermined delay characteristic is a linearly changing delay characteristic and the configuration of said aperture is a straight line disposed at a given angle with respect to a line parallel to said given coordinate.

5. A delay device having a predetermined delay characteristic comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration correlated with said predetermined delay characteristic, a source of a repetitious signal, means to deflect said electron beam horizontally across said screen and spaced below said aperture in synchronism with said repetitious signal, a time modulated pulse signal source, means responsive to the time position of a pulse signal from said source to deflect said electron beam substantially at a 45-degree angle with respect to the horizontal sweep of said beam to cause said beam to cross said aperture, and means to derive a pulse output from the electrons impinging on said target electrode, said pulse output being delayed in time with respect to the time position of said pulse signal in accordance with the time that the electron beam crosses said aperture.

6. A delay device having a delay characteristic complementary to a predetermined delay characteristic comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration of said predetermined delay characteristic, a source of a repetitious signal, means to deflect said electron beam horizontally across said screen at a first rate and spaced above said aperture in synchronism with said repetitious signal, a pulse signal source, means responsive to the time position of a pulse signal from said source to produce a horizontal and vertical sweep voltage each at a second rate to deflect said electron beam at substantially a 45-degree angle with respect to the horizontal sweep of said beam to cause said beam to cross said aperture, and means to derive a pulse output from the electrons impinging on said target electrode, said pulse output being delayed in time with respect to the time position of said pulse signal complementary to said predetermined delay characteristic in accordance with the time that the electron beam crosses said aperture.

7. A pulse time modulation compressor comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration related to a desired non-linear pulse time modulation compression characteristic, a source of pulse time modulation repetitious synchronizing signal, means to deflect said electron beam horizontally across said screen and spaced below said aperture in synchronism with said synchronizing signal, a pulse time modulated signal source, means responsive to the time position of a pulse signal from said signal source to deflect said electron beam at substantially a 45-degree angle with respect to the horizontal deflection of said beam to cause said beam to cross said aperture, and means to derive a pulse output from the electrons impinging on said target electrode, said pulse output being compressed in time with respect to the time position of said pulse signal in accordance with the time that the electron beam crosses said aperture.

8. A pulse time modulation expander comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration related to a desired non-linear pulse time modulation expansion characteristic, a source of pulse time modulation repetitious synchronizing signal, means to deflect said electron beam horizontally across said screen and spaced below said aperture in synchronism with said synchronizing signal, a pulse time modulated signal source, means responsive to the time position of a pulse signal from said signal source to deflect said electron beam at substantially a 45-degree angle with respect to the horizontal deflection of said beam to cause said beam to cross said aperture, and means to derive a pulse output from the electrons impinging on said target electrode, said pulse output being expanded in time with respect to the time position of said pulse signal in accordance with the time that the electron beam crosses said aperture.

9. A pulse time modulation stretcher comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration related to a desired linearly increasing pulse time modulation stretcher characteristic, a source of pulse time modulation repetitious synchronizing signal, means to deflect said electron beam horizontally across said screen and spaced below said aperture in synchronism with said synchronizing signal, a pulse time modulated signal source, means responsive to the time position of a pulse signal from said signal source to deflect said electron beam at substantially a 45-degree angle with respect to the horizontal deflection of said beam to cause said beam to cross said aperture, and means to derive a pulse output from the electrons impinging on said target electrode, said pulse output being stretched in time with respect to the time position of said pulse signal in accordance with the time that the electron beam crosses said aperture.

10. A pulse time modulation contractor comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration related to a desired linearly decreasing pulse time modulation contractor characteristic, a source of pulse time modulation repetitious synchronizing signal, means to deflect said electron beam horizontally across said screen and spaced below said aperture in synchronism with said synchronizing signal, a pulse time modulated signal source, means responsive to the time position of a pulse signal from said signal source to deflect said electron beam at substantially a 45-degree angle with respect to the horizontal deflection of said beam to cause said beam to cross said aperture, and means to derive a pulse output from the electrons impinging on said target electrode, said pulse output being contracted in time with respect to the time position of said pulse signal in accordance with the time that the electron beam crosses said aperture.

11. A delay device comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration related to a constant delay characteristic, a source of pulse time modulation repetitious synchronizing signal, means to deflect said electron beam horizontally across said screen and spaced below said aperture in synchronism with said synchronizing signal, a pulse time modulated signal source, means responsive to the time position of a pulse signal from said signal source to deflect said electron beam at substantially a 45-degree angle with respect to the horizontal deflection of said beam to cause said beam to cross said aperture, and means to derive a pulse output from the electrons impinging on said target electrode, said pulse output having a constant delay with respect to the time position of said pulse signal in accordance with the time that the electron beam crosses said aperture.

12. A pulse time modulation expander comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration of a given non-linear compression characteristic, a source of pulse time modulation repetitious synchronizing signal, means to deflect said electron beam horizontally across said screen at a first rate and spaced above said aperture in synchronism with said synchronizing signal, a pulse signal source, means responsive to the time position of a pulse signal from said source to produce horizontal and vertical sweep voltages each at a second rate to deflect said electron beam at substantially a 45-degree angle with respect to the horizontal sweep of said beam to cause said beam to cross said aperture, and means to derive a pulse output from the electrons impinging on said target electrode, said pulse output being expanded in time with respect to the time position of said pulse signal in accordance with the time that the electron beam crosses said aperture.

13. In a pulse time modulation communication system, a compandor comprising at the multiplexer end of said communication system a compressor including an electron beam tube having means to project an electron beam along a given path, a target electrode disposed in said path and adapted to be impinged on by said electron beam and an alectron opaque screen disposed in said path intermediate said target electrode and said beam projecting means, said screen including an aperture therethrough having a configuration related to a desired non-linear pulse time modulation compression characteristic, a source of pulse time modulation repetitious synchronizing signal, means to deflect said electron beam horizontally across said screen and spaced below said aperture in synchronism with said synchronizing signal, a pulse time modulated signal source, means responsive to the time position of a pulse signal from said signal source to deflect said electron beam at substantially a 45-degree angle with respect to the horizontal deflection of said beam to cause said beam to cross said aperture, and means to derive a pulse output from the electrons impinging on said target electrode, said pulse output being compressed in time with respect to the time position of said pulse signal in accordance with the time that the electron beam crosses said aperture and at the demultiplexer end of said communication system an expander including an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration related to a non-linear pulse time modulation expansion characteristic which is complementary to the screen aperture of said compressor, a source of pulse time modulation repetitious synchronizing signal, means to deflect said electron beam horizintally across said expander screen and spaced below said aperture in synchronism with said synchronizing signal, means responsive to the time position of the pulse output of said compressor to deflect said electron beam at substantially a 45-degree angle with respect to the horizontal deflection of said beam to cause said beam to cross said aperture, and means to derive an expander pulse output from the electrons impinging on said expander target electrode, said expander pulse output being expanded in time with respect to the time position of the pulse output of said compressor in accordance with the time that the electron beam crosses said aperture such that the resultant pulse time modulation signal is returned to the original pulse deviation found at the output of said signal source.

14. A device for modifying the time position of a time modulated pulse signal in accordance with a predetermined characteristic comprising an electron beam tube having means to project an electron beam along a given path, a target electrode disposed in said path and adapted to be impinged on by said electron beam and an electron opaque screen disposed in said path intermediate said target electrode and said beam projecting means, said screen including an aperture therethrough having a configuration correlated with said predetermined characteristic, a source of repetitious signal, means to deflect said electron beam across said screen along a given coordinate and spaced from said aperture in synchronism with said repetitious signal, a pulse time modulated signal source, said time modulated signal source including a plurality of successive pulse time modulated channel signals, said repetitious signal including a plurality of synchronizing signals each related to a different one of said channel signals, means responsive to the time position of a pulse signal from said time modulated signal source to deflect said electron beam in a second coordinate angularly related to said given coordinate to cause said beam to cross said aperture, and means to derive a pulse output from the electrons impinging on said target electrode, said pulse output being modified in time with respect to the time position of said time modulated pulse signal in accordance with the time that the electron beam crosses said aperture.

References Cited in the file of this patent

UNITED STATES PATENTS

| | | |
|---|---|---|
| 2,189,898 | Hartley | Feb. 13, 1940 |
| 2,219,021 | Riesz | Oct. 22, 1940 |
| 2,516,886 | Labin et al. | Aug. 1, 1950 |
| 2,619,636 | Veaux | Nov. 25, 1952 |
| 2,629,771 | Anderson et al. | Feb. 24, 1953 |
| 2,795,650 | Levine | June 11, 1957 |